United States Patent
Merker et al.

(10) Patent No.: US 7,972,534 B2
(45) Date of Patent: Jul. 5, 2011

(54) RETARDING OXIDANTS FOR PREPARING CONDUCTIVE POLYMERS

(75) Inventors: Udo Merker, Köln (DE); Stephan Kirchmeyer, Leverkusen (DE); Klaus Wussow, Netphen (DE)

(73) Assignee: H. C. Starck GmbH, Goslar (DE)

( * ) Notice: Subject to any disclaimer, the term of this patent is extended or adjusted under 35 U.S.C. 154(b) by 468 days.

(21) Appl. No.: 10/551,527

(22) PCT Filed: Mar. 20, 2004

(86) PCT No.: PCT/EP2004/002951
§ 371 (c)(1),
(2), (4) Date: Sep. 30, 2005

(87) PCT Pub. No.: WO2004/088672
PCT Pub. Date: Oct. 14, 2004

(65) Prior Publication Data
US 2006/0180797 A1    Aug. 17, 2006

(30) Foreign Application Priority Data

Apr. 2, 2003   (DE) .................................. 103 14 978
May 28, 2003  (DE) .................................. 103 24 534

(51) Int. Cl.
    *H01B 1/02*    (2006.01)
(52) U.S. Cl. ........ 252/500; 205/543; 361/525; 528/423; 528/373
(58) Field of Classification Search .................. 252/500, 252/518.1; 428/402; 429/213; 528/373, 528/423; 427/213.3; 361/525; 205/543
See application file for complete search history.

(56) References Cited

U.S. PATENT DOCUMENTS

| 4,697,001 | A | * | 9/1987 | Walker et al. ................. 528/423 |
| 4,910,645 | A | * | 3/1990 | Jonas et al. ................... 361/525 |
| 4,959,430 | A | | 9/1990 | Jonas et al. |
| 4,987,042 | A | * | 1/1991 | Jonas et al. .................... 429/213 |
| 5,300,575 | A | | 4/1994 | Jonas et al. |
| 5,427,841 | A | | 6/1995 | De Leeuw et al. |
| 5,455,736 | A | | 10/1995 | Nishiyama et al. |
| 5,986,046 | A | * | 11/1999 | Nishiyama et al. .......... 528/423 |
| 6,001,281 | A | | 12/1999 | Lessner et al. |
| 6,056,899 | A | * | 5/2000 | Lessner et al. ............. 252/518.1 |
| 6,136,372 | A | * | 10/2000 | Lessner et al. ............. 427/213.3 |
| 6,334,966 | B1 | * | 1/2002 | Hahn et al. .................... 252/500 |

(Continued)

FOREIGN PATENT DOCUMENTS

EP    0 339 340    11/1989

(Continued)

OTHER PUBLICATIONS

Ullmanns Encyclopädie der technischen Chemie (Verlag Chemie, Weinheim), vol. 13, 4$^{th}$ Edition, pp. 281-308.

(Continued)

*Primary Examiner* — Khanh Tuan Nguyen
(74) *Attorney, Agent, or Firm* — Norris, McLaughlin & Marcus, P.A.

(57) ABSTRACT

Process for preparing specific oxidants which in mixtures with precursors for preparing conductive polymers display a long processing time during the polymerization; oxidants obtainable by this process; mixtures comprising such specific (retarding) oxidants and the use of said oxidants for preparing solid electrolyte capacitors and conductive layers.

13 Claims, 3 Drawing Sheets

U.S. PATENT DOCUMENTS

| | | | |
|---|---|---|---|
| 7,053,174 B2 | 5/2006 | Kirchmeyer et al. | |
| 7,112,368 B2 * | 9/2006 | Hsu | 428/402 |
| 2002/0077450 A1 * | 6/2002 | Kirchmeyer et al. | 528/373 |
| 2003/0118829 A1 | 6/2003 | Hsu | |
| 2003/0149171 A1 | 8/2003 | Groenendaal et al. | |

FOREIGN PATENT DOCUMENTS

| | | | |
|---|---|---|---|
| EP | 0 440 957 | | 8/1991 |
| EP | 0 615 256 | | 9/1994 |
| EP | 1 215 224 | | 6/2002 |
| JP | 63-023933 | * | 2/1988 |
| JP | 63023933 A | | 2/1988 |
| JP | 2002138135 A | | 5/2002 |
| JP | 2002138136 A | | 5/2002 |
| JP | 2002138137 A | | 5/2002 |
| JP | 2002206022 A | | 7/2002 |
| WO | WO 03/040207 | | 5/2003 |

OTHER PUBLICATIONS

F.G. Helfferich, "Kinetics of homogeneous multistep reactions" edited by R.G. Compton and G. Hancock, vol. 38, Comprehensive Chemical Kinetices, Elsevier, Amsterdam 2001.

Leeuw De D M et al., "Electroplating of Conductive Polymers for the Metallization of Insulators", Synthetic Metals, Elsevier Sequoia, Lausanne, Ch, vol. 66, No. 3, Oct. 1994, pp. 263-273.

Groenendaal L et al., "Poly(3,4-ethylenedioxythiophene) and its derivatives: past, present and future", Advanced Materials, VCH Verlagsgesellschaft, Weinheim, DE, vol. 12, No. 7, Apr. 2000, pp. 481-494.

Houben Weyl, Methoden der organischen Chemie, vol. E 20 Makromolekulare Stoffe, Part 2, (1987), p. 1141 ff.

U. Merker et al. PEDT as Conductive Polymer Cathode in Electrolytic Capacitors Proceedings CARTS-Europe 2002.

New Chemically Prepared conducting "Pyrrole Blacks"; John A. Walker, et al.,; Journal of Polymer Science: Part A: Polymer Chemistry, vol. 26, 1285-1294 (1988).

* cited by examiner

RETARDING OXIDANTS FOR PREPARING CONDUCTIVE POLYMERS

This is a 371 of PCT/EP2004/002951 filed 20 Mar. 2004 (international filing date).

The invention relates to a process for preparing specific oxidants which in mixtures with precursors for preparing conductive polymers display a long processing time during the polymerization, to oxidants obtainable by this process, to mixtures comprising such specific (retarding) oxidants and to their use for preparing solid electrolyte capacitors and conductive layers.

BACKGROUND OF THE INVENTION

π-Conjugated polymers as a class have in recent decades been the subject of numerous publications. They are also referred to as conductive polymers or as synthetic metals.

Conductive polymers are gaining increasing economic importance, since polymers have advantages over metals in terms of processibility, weight and the targeted setting of properties by means of chemical modification. Examples of known π-conjugated polymers are polypyrroles, polythiophenes, polyanilines, polyacetylenes, polyphenylenes and poly(p-phenylene-vinylenes). Layers of conductive polymers are widely used in industry. A review may be found in L. Groenendaal, F. Jonas, D. Freitag, H. Pielartzik & J. R. Reynolds, Adv. Mater. 12 (2000) 481-494.

Conductive polymers are prepared by chemical oxidation or electrochemically from precursors for the preparation of conductive polymers, e.g. substituted or unsubstituted thiophenes, pyrroles and anilines and their possibly oligomeric derivatives. Polymerization by chemical oxidation is particularly widespread because it can be applied in a technically simple fashion to a variety of substrates. For this purpose, the precursors for the preparation of conductive polymers are polymerized by means of an oxidant. The polymerization is so fast that the precursors for the preparation of conductive polymers and the oxidant generally have to be applied to the substrate one after the other. However, a problem with this sequential application is that stoichiometric ratios between the precursors for the preparation of conductive polymers and the oxidant can be set only with great difficulty. As a result, the reaction to form the polymer is incomplete, the precursors are utilised only incompletely and the quality of the conductive layer and its conductivity are decreased.

Furthermore, the sequential application multiplies the number of process steps necessary, so that sequential processes are associated with significantly higher process costs. It is therefore desirable to use precursors for the preparation of conductive polymers and the oxidant together and in precisely defined mixtures.

Mixtures of oxidants and precursors for the preparation of conductive polymers have sufficiently low reaction rates to be able to be employed in industrially useable processes only at low temperatures. Thus, for example, in U.S. Pat. No. 5,455,736, a dilute mixture of pyrrol and oxidant is cooled to low temperatures in order to slow the polymerization sufficiently. However, the use of low temperatures is firstly very complicated in engineering terms and, secondly, the solubility of the oxidant is limited at low temperatures and the viscosity of the solution increases greatly with decreasing temperature. A further disadvantage is that the low temperature results in moisture from the surrounding air getting into the cooled solutions and the quality of the conductive polymers prepared from the solutions being altered in a disadvantageous manner.

EP-A 339 340 describes the polymerization of 3,4-disubstituted thiophenes by chemical oxidation. If the oxidant is selected appropriately, these thiophenes can also be processed in solution in the presence of the oxidant to produce conductive layers. However, here too, the reaction commences after only a few minutes.

EP-A 615 256 states that the polymerization in mixtures of oxidants and precursors for the preparation of conductive polymers can be slowed by addition of a non-volatile base such as imidazole. In this way, the polymerization can be suppressed for a few hours. However, the additive remains in the conductive layer and can there have an adverse effect on the function of the layer.

In U.S. Pat. No. 6,001,281, the polymerization is slowed by use of two solvents having different boiling points. The more volatile solvent is chosen so that it forms a weak complex with the Fe(III) used as oxidant and thus slows the reaction. On the other hand, the solvent having the higher boiling point does not complex the Fe(III). To carry out the polymerization, the more volatile solvent is evaporated, after which the reaction proceeds in an accelerated fashion. This method has the great disadvantage that the reactive solution has to be strongly diluted with a further solvent. Furthermore, the solvents used, e.g. tetrahydrofuran, are industrially undesirable.

There is therefore a continuing need for oxidants which can be employed together with precursors for the preparation of conductive polymers at temperatures which can easily be managed industrially, with the polymerization being suppressed for a time which is sufficiently long for industrial applications without complicated further process steps having to be carried out to prevent it.

It is therefore an object of the invention to find and prepare suitable oxidants for the polymerization of precursors for the preparation of conductive polymers by chemical oxidation, which oxidants suppress the polymerization for a sufficiently long time and by means of which conductive layers, for example for solid electrolyte capacitors or other applications, can be produced.

SUMMARY OF THE INVENTION

A further object is to find such suitable oxidants which are additionally storage-stable.

It has now surprisingly been found that oxidants which have been prepared by treating a metal salt of an organic acid or an inorganic acid having organic radicals with an ion exchanger meet these requirements.

DETAILED DESCRIPTION

The present invention accordingly provides a process for preparing an oxidant for the preparation of conductive polymers, characterized in that a metal salt of an organic acid or an inorganic acid having organic radicals is treated with an ion exchanger.

Within the scope of the invention, the definitions, definitions of radicals, parameters and explanations given below, either in general terms or in preferred ranges, can be combined with one another and also between the respective ranges and preferred ranges in any desired way.

As ion exchangers, it is possible to use inorganic or organic ion exchangers, but preference is given to organic ion exchangers.

Examples of inorganic anion exchangers are zeolites, montmorillonites, attapulgites, bentonites and other aluminosilicates, and also acid salts of polyvalent metal ions, e.g. zirconium phosphate, titanium tungstate, nickel hexacyanoferrate(II).

Examples of organic anion exchangers are polycondensates, e.g. of phenol and formaldehyde, or polymers, e.g. polymers obtainable by copolymerization of styrene, acrylates or methacrylates and divinylbenzene, which have subsequently been functionalized appropriately. However, it is also possible to use other appropriately functionalized macromolecules, for example macromolecules of natural origin, e.g. celluloses, dextrans and aragoses.

The above listing is for the purposes of illustration and does not imply a restriction.

The ion exchangers can be used in the use forms known to those skilled in the art, for example in bead form, as granules, as powdered resins, in milled form incorporated in woven fabrics or fibres, as papers, layers or other bodies, in the form of ion-exchange membranes, as liquid organic ion exchangers or, if desired, as magnetic ion exchangers. The ion exchangers can be macroporous, microporous or in the form of gels. Preference is given to using macroporous ion exchangers.

Anion exchangers are preferably used as ion exchangers. Anion exchangers have basic functional groups, for example primary, secondary or tertiary amine groups or quaternary ammonium groups, bound to the ion exchangers. Depending on the type and combination of the functional groups, the basicity of the ion exchangers can vary. For example, strongly basic ion exchangers usually contain quaternary ammonium groups, while weakly basic ion exchangers frequently bear the less basic primary, secondary and/or tertiary amine groups. However, any mixed forms between strongly and weakly basic ion exchangers are also known. Weakly basic anion exchangers are particularly useful for the purposes of the invention. These can, for example, bear primary, secondary and/or tertiary amine groups, if desired together with quaternary ammonium groups. Particular preference is given to weakly basic ion exchangers which have predominantly or exclusively tertiary amine groups as functional groups.

Ion exchangers and their preparation are known to those skilled in the art and are described in the relevant technical literature, for example in Ullmanns Encyclopadie der technischen Chemie (Verlag Chemie, Weinheim), Volume 13, $4^{th}$ Edition, pp. 281-308. However, all ion exchangers which can be prepared by more recent methods and have the properties described above are also suitable for carrying out the process of the invention.

Examples of suitable ion exchangers are macroporous polymers of styrene and divinylbenzene which have been functionalized with tertiary amines, as are marketed, for example, under the trade name Lewatit® by Bayer AG, Leverkusen.

The ion exchangers can be used in the process of the invention without prior treatment. However, it is likewise possible to treat the ion exchangers with, for example, acids such as sulphuric acid or bases such as sodium hydroxide or potassium hydroxide before use, for example to regenerate them before they are used. The ion exchangers used according to the invention can also be subjected to such a regeneration when their capacity has become exhausted, i.e. they have become laden as a result of use in the process of the invention, to such an extent that they no longer have sufficient exchange capacity for carrying out the process of the invention. In this way, ion exchangers can be recycled for use in the process of the invention.

The treatment of the metal salts with the ion exchanger is preferably carried out in the presence of a solvent or a plurality of different solvents. The treatment can be carried out continuously or batchwise, e.g. by mixing, stirring or shaking and subsequent separation. In a preferred embodiment, the treatment is carried out continuously. For this purpose, a solution of the metal salt is, for example, passed through a column containing the ion exchanger. However, metal salt, solvent and ion exchanger can also be brought together in a vessel and stored there for a period of, for example, from one minute to 72 hours. The ion exchanger can, for example, then be separated off from the oxidant by means of a filter, a membrane or a centrifuge.

Depending on the solvent used and the thermal stability of the ion exchanger used, the process of the invention can be carried out at temperatures of, for example, from −20° C. to 120° C. Preference is given to temperatures which allow the process to be carried out simply and inexpensively on an industrial scale, for example temperatures of from 10 to 40° C., particularly preferably room temperature.

The amount of ion exchanger added depends on its capacity and the contact time of metal salt and ion exchanger. It can, if desired, be established by means of preliminary experiments. It is advantageous to select such an amount of ion exchanger that the resulting oxidants according to the invention just lead to a sufficiently low polymerization rate. If the amount of ion exchanger is too low, the ion exchanger can become exhausted before the metal salt has been treated sufficiently; while a contact time which is too short can, despite sufficient capacity of the ion exchanger, lead to incomplete treatment of the metal salt. Capacities which are too high and/or contact times with the ion exchanger which are too long can result in an oxidant which virtually completely suppresses the polymerization at appropriate process temperatures. The amount of ion exchanger to be added can, if desired, be established by means of preliminary experiments.

The ion exchangers used can contain water or be water-free. For the purposes of the invention, "water-containing" means, in particular, a water content of 1% by weight or more. In preferred embodiments, commercial ion exchangers having a commercial water content of, for example, from 30 to 70% by weight are used. The water content of the ion exchanger can, if desired, be reduced by, for example, rinsing with a solvent or drying before treatment of the metal salt. This is particularly advantageous if a solution of an oxidant having a low water content is desired.

It has surprisingly been found that solutions of oxidants according to the invention having a low water content are storage-stable under customary storage and transport conditions. For the purposes of the present invention, customary storage and transport conditions are, for example, ambient pressure and ambient temperatures during transport and storage. Ambient temperatures in particular can vary depending on geographic position and time of year and are generally up to 30° C. However, temperatures up to 50° C. or higher can also be reached.

In further preferred embodiments of the present invention, use is therefore made of ion exchangers having a water content which is sufficiently low for the solution of the oxidant of the invention after treatment with the ion exchanger to have a water content of from 0 to 10% by weight, preferably from 0 to 5% by weight, particularly preferably from 0 to 2% by weight, in each case based on the total weight of the solution. The water content of ion exchangers having a high water content can for this purpose be reduced by, for example, stepwise or continuous rinsing with a water-free solvent or by thermal drying or vacuum drying before the treatment of the oxidant. As solvent for rinsing, preference is given to using the same solvent in which the oxidant is dissolved. However, it is also possible to use other, for example cheaper, solvents. When ion exchangers having a relatively high water content are used, the water content of the oxidants of the invention after treatment with the ion exchanger can also be reduced subsequently, for example by drying and subsequent dissolution in a water-free solvent or by use of water-withdrawing agents, for example molecular sieves.

Such solutions of the oxidants of the invention having a low water content are found to be storage-stable under customary storage and transport conditions, i.e. they do not form any precipitates during a period of up to several months. On the other hand, solutions of oxidants according to the invention having an increased water content form precipitates under the same conditions over the course of time, i.e. sometimes after only a few hours or days. However, the latter solutions of oxidants according to the invention can be cooled to temperatures of 10° C. or below, preferably 6° C. or below, to increase the storage stability.

The advantage of the solutions of the oxidants of the invention having a low water content over solutions of oxidants according to the invention having a higher water content is therefore that transport and/or storage do not require separate cooling.

The solutions of the oxidants of the invention preferably contain from 1 to 80% by weight, particularly preferably from 10 to 60% by weight, very particularly preferably from 15 to 50% by weight, of the oxidant of the invention.

As metal salts, it is possible to use all metal salts known to those skilled in the art as oxidants for the oxidative polymerization of thiophenes, anilines or pyrroles.

Suitable metal salts are metal salts of main group or transition group metals, the latter also referred to in the following as transition metal salts, of the Periodic Table of the Elements of Mendeleev. Preference is given to transition metal salts. Suitable transition metal salts are, in particular, salts of an inorganic or organic acid or an inorganic acid having organic radicals with transition metals, e.g. iron(III), copper(II), chromium(VI), cerium(IV), manganese(IV), manganese(VII), ruthenium(III) and zinc(II).

Preferred transition metal salts are those of iron(III). Iron (III) salts are frequently inexpensive, readily available and easy to handle, e.g. the iron(III) salts of inorganic acids, for example iron(III) halides (e.g. $FeCl_3$) or iron(III) salts of other inorganic acids, e.g. $Fe(ClO_4)_3$ or $Fe_2(SO_4)_3$, and iron (III) salts of organic acids and inorganic acids having organic radicals.

Examples of iron(III) salts of inorganic acids having organic radicals are the iron(III) salts of the sulphuric monoesters of $C_1$-$C_{20}$-alkanoles, e.g. the iron(III) salt of lauryl sulphate.

Particularly preferred transition metal salts are those of an organic acid, in particular iron(III) salts of organic acids.

Examples of iron(III) salts of organic acids are: the iron (III) salts of $C_1$-$C_{20}$-alkanesulphonic acids such as methanesulphonic, ethanesulphonic, propanesulphonic, butanesulphonic or higher sulphonic acids, e.g. dodecanesulphonic acid, of aliphatic perfluorosulphonic acids such as trifluoromethanesulphonic acid, perfluorobutanesulphonic acid or perfluorooctanesulphonic acid, of aliphatic $C_1$-$C_{20}$-carboxylic acids such as 2-ethylhexylcarboxylic acid, of aliphatic perfluorocarboxylic acids such as trifluoroacetic acid or perfluorooctanoic acid, and of aromatic, unsubstituted or $C_1$-$C_{20}$-alkyl-substituted sulphonic acids such as benzenesulphonic acid, o-toluenesulphonic acid, p-toluenesulphonic acid or dodecylbenzenesulphonic acid and of cycloalkanesulphonic acids such as camphorsulphonic acid.

It is also possible to use any mixtures of the abovementioned iron(III) salts of organic acids.

The use of the iron(III) salts of organic acids and of the inorganic acids having organic radicals has the great advantage that they are not corrosive.

Very particularly preferred metal salts are iron(III) p-toluenesulphonate, iron(III) o-toluenesulphonate or a mixture of iron(III) p-toluenesulphonate and iron(III) o-toluenesulphonate.

Further suitable metal salts are peroxo compounds such as peroxodisulphates (persulphates), in particular ammonium and alkali metal peroxodisulphates, e.g. sodium and potassium peroxodisulphate, or alkali metal perborates and transition metal oxides, e.g. manganese(IV) oxide or cerium(IV) oxide.

As solvents, mention may be made of, in particular, the following organic solvents which are inert under the reaction conditions: aliphatic alcohols such as methanol, ethanol, i-propanol and butanol; aliphatic ketones such as acetone and methyl ethyl ketone; aliphatic carboxylic esters such as ethyl acetate and butyl acetate; aromatic hydrocarbons such as toluene and xylene; aliphatic hydrocarbons such as hexane, heptane and cyclohexane; chlorinated hydrocarbons such as dichloromethane and dichloroethane; aliphatic nitrites such as acetonitrile, aliphatic sulphoxides and sulphones such as dimethyl sulphoxide and sulpholane; aliphatic carboxamides such as methylacetamide, dimethylacetamide and dimethylformamide; aliphatic and araliphatic ethers such as diethyl ether and anisole. It is also possible to use water or mixtures of water with the abovementioned organic solvents as solvent. Solvents from the selection mentioned above which undergo a reaction with the ion exchanger which adversely affects the process of the invention are added only after the treatment with the ion exchanger, either after prior removal of the previous solvent or in addition to this.

Preference is given to using one or more alcohol(s), water or a mixture of one or more alcohol(s) and water as the solvent or solvents. Particularly preferred alcohols are butanol, ethanol and methanol.

The oxidant prepared according to the invention can be separated from the solvent after treatment with the ion exchanger and can, if desired, be redissolved in the same solvent or another solvent from the selection mentioned above.

The invention further provides oxidants or solutions of oxidants obtainable by the novel process described above. Here, all preference ranges applying to the process of the invention also apply individually and in any combinations to the oxidants or solutions thereof obtainable by this process. According to the invention, preference is given to oxidants or solutions of oxidants which have been prepared by the novel process described above.

Compared with oxidants which have not been treated with ion exchangers, the oxidants of the invention in the same concentration and at the same reaction temperature slow or delay polymerization in reactive mixtures of precursors for the preparation of conductive polymers and oxidants according to the invention. They are therefore also referred to as retarding oxidants in the following.

The reaction rate in the reactive mixtures and thus also the delaying or slowing action can, if desired, also be reduced further by dilution and/or cooling.

Furthermore, layers having a higher conductivity may be able to be produced from the oxidants of the invention than from oxidants which have not been treated with ion exchangers.

The retarding (delaying or slowing) action of the oxidants of the invention can, for example, be observed purely visually in a simple way. To determine the retarding action, it is possible to measure, for example, the time in which the first polymer particles visible to the eye are formed. The time to visible formation of polymer particles in the reactive mixtures is preferably longer than one hour, particularly preferably longer than 10 hours and very particularly preferably longer than 20 hours.

The invention therefore provides for the use of the oxidants obtainable by the process of the invention as retarding oxidants in the oxidative polymerization of precursors for the preparation of conductive polymers.

For the purposes of the invention, the term polymers encompasses all compounds having more than one repeating unit.

In the present context, conductive polymers are polymers belonging to the class of π-conjugated polymers which after oxidation or reduction display electric conductivity. For the purposes of the invention, conductive polymers are preferably π-conjugated polymers which are electrically conductive after oxidation. Examples which may be mentioned here are substituted or unsubstituted polythiophenes, polypyrroles and polyanilines. Preferred conductive polymers for the purposes of the invention are substituted or unsubstituted polythiophenes, in particular substituted or unsubstituted poly(3,4-ethylenedioxythiophenes).

Precursors for the preparation of conductive polymers, hereinafter also referred to simply as precursors, are accordingly corresponding monomers or derivatives thereof. It is also possible to use mixtures of different precursors. Suitable monomeric precursors are, for example, substituted or unsubstituted thiophenes, pyrroles or anilines, preferably substituted or unsubstituted thiophenes, particularly preferably substituted or unsubstituted 3,4-alkylenedioxythiophenes.

As substituted 3,4-alkylenedioxythiophenes, mention may be made by way of example of the compounds of the formula (I),

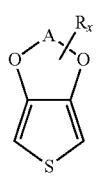

where
A is a substituted or unsubstituted $C_1$-$C_5$-alkylene radical, preferably a substituted or unsubstituted $C_2$-$C_3$-alkylene radical,
R is a linear or branched, substituted or unsubstituted $C_1$-$C_{18}$-alkyl radical, preferably a linear or branched, substituted or unsubstituted $C_1$-$C_{14}$-alkyl radical, substituted or unsubstituted $C_5$-$C_{12}$-cycloalkyl radical, substituted or unsubstituted $C_6$-$C_{14}$-aryl radical, substituted or unsubstituted $C_7$-$C_{18}$-aralkyl radical, substituted or unsubstituted $C_1$-$C_4$-hydroxyalkyl radical, preferably a substituted or unsubstituted $C_1$-$C_2$-hydroxyalkyl radical, or a hydroxyl radical,
x is an integer from 0 to 8, preferably from 0 to 6, particularly preferably 0 or 1,
where if a plurality of radicals R are bound to A, they can be identical or different.

In the formula (I), x substituents R can be bound to the alkylene radical A.

Very particularly preferred monomeric precursors are substituted or unsubstituted 3,4-ethylene-dioxythiophenes.

As substituted 3,4-ethylenedioxythiophenes, mention may be made by way of example of the compounds of the formula (Ia),

where R and x are as defined for the formula (I).

For the purposes of the invention, derivatives of these monomeric precursors are, for example, dimers or trimers of these monomeric precursors. Higher molecular weight derivatives, i.e. tetramers, pentamers, etc., of the monomeric precursors are also possible as derivatives.

As derivatives of substituted 3,4-alkylenedioxythiophenes, mention may be made by way of example of the compounds of the formula (II),

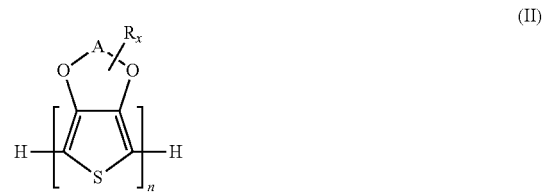

where
n is an integer from 2 to 20, preferably from 2 to 6, particularly preferably 2 or 3,
and
A, R and x are as defined for the formula (I).

The derivatives can be made up of identical or different monomer units and can be used in pure form or in admixture with one another and/or with the monomeric precursors. Oxidized or reduced forms of these precursors are also encompassed by the term "precursors" for the purposes of the invention, as long as polymerization of them forms the same conductive polymers as in the case of the precursors mentioned above.

Possible substituents for the precursors, in particular for the thiophenes, preferably for the 3,4-alkylenedioxythiophenes, are the radicals mentioned for R in the formula (I).

$C_1$-$C_5$-Alkylene radicals A are, for the purposes of the invention, methylene, ethylene, n-propylene, n-butylene or n-pentylene. $C_1$-$C_{18}$-alkyl refers, for the purposes of the invention, to linear or branched $C_1$-$C_{18}$-alkyl radicals such as methyl, ethyl, n-propyl or isopropyl, n-butyl, isobutyl, sec-butyl or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$-$C_{12}$-cycloalkyl refers to $C_5$-$C_{12}$-cycloalkyl radicals such as cyclopentyl, cyclohexyl, cycloheptyl, cyclooctyl, cyclononyl or cyclodecyl, $C_6$-$C_{14}$-aryl refers to $C_6$-$C_{14}$-aryl radicals such as phenyl, o-, m-, p-tolyl, 2,3-, 2,4-, 2,5-, 2,6-, 3,4-, 3,5-xylyl, mesityl or naphthyl, and $C_7$-$C_{18}$-aralkyl $C_7$-$C_{18}$-aralkyl radicals such as benzyl. The above listing serves to illustrate the invention by way of example and is not to be regarded as exhaustive.

Possible substituents on the radicals R include numerous organic groups, for example alkyl, cycloalkyl, aryl, halogen, hydroxyl, ether, thioether, disulphide, sulphoxide, sulphonic acid, sulphonate, amino, aldehyde, keto, carboxylic ester, carbonate, carboxylate, cyano, alkylsilane and alkoxysilane groups and also carboxamide groups.

Methods of preparing the monomeric precursors for the preparation of conductive polymers and also their derivatives are known to those skilled in the art and are described, for example, in L. Groenendaal, F. Jonas, D. Freitag, H. Pielartzik & J. R. Reynolds, Adv. Mater. 12 (2000) 481-494, and references cited therein.

The advantage of the simultaneous application of oxidants and precursors for the preparation of conductive polymers at industrially readily manageable temperatures is that it significantly reduces the number of process steps. In addition, a defined stoichiometric ratio between the reactants can be set in this way. This makes it possible, for example, to convert a high proportion of the precursors, possibly up to almost 100%, into the polymer.

Furthermore, the solutions or mixtures of the oxidants obtainable according to the invention and the precursors are particularly suitable for producing conductive layers on the surface of porous or smooth substrates. As a result of the oxidants and the precursors being uniformly distributed in the mixtures, homogeneous, i.e. dense in the sense of having little or no porosity, polymer layers are formed in the polymerization. In contrast, in the case of sequential application of oxidant and precursors, porous polymer layers are formed because of local deficiencies or excesses of oxidant and precursors. The conductive layers obtainable from the mixtures of the invention are therefore particularly homogeneous and have a high conductivity.

Furthermore, the solutions or mixtures of the invention remain processable for a significantly longer time than those containing oxidants which have not been treated with an ion exchanger. This makes it possible for the first time to use these mixtures or solutions in continuous, industrial manufacturing processes.

The invention likewise provides mixtures comprising precursors for the preparation of conductive polymers and one or more oxidants according to the invention and, if desired, one or more solvents, characterized in that the formation of polymers in the mixtures is delayed in comparison with untreated oxidants.

Preference ranges, definitions and examples indicated above for precursors, oxidants according to the invention and solvents apply analogously here.

The mixtures of the invention can be homogeneous or heterogeneous and consist of one or more phases. The mixtures of the invention are preferably solutions.

The oxidants and precursors for the preparation of conductive polymers can be mixed with one another as solids and/or liquids. However, one or more solvents are preferably added to the mixtures. Suitable solvents are, in particular, the solvents which have already been mentioned above. It is also possible to produce the mixtures directly on the surface to be coated, for example on an oxide layer of a metal or on a substrate surface. For this purpose, oxidants and precursors for the preparation of conductive polymers are applied in succession, preferably in the form of solutions, to the surface to be coated. This mixture is then formed by mixing of the individual components, i.e. oxidants and precursors, on the surface to be coated or, possibly after partial or complete evaporation of the solvents, by diffusion at the interface between oxidants and precursors.

The mixtures of the invention can contain water. This water can, for example, originate from the oxidant of the invention or its solution and/or can be added afterwards to the mixtures of the invention. The addition of water can increase the inhibition of the formation of polymers in the mixtures of the invention, i.e. the pot life. Additional water is preferably added when using oxidants according to the invention or solutions thereof having a low water content. Preference is given to adding from 1 to 100% by weight, particularly preferably from 1 to 60% by weight, very particularly preferably from 1 to 40% by weight, of water, based on the weight of the oxidant of the invention.

The conductive polymers prepared using the oxidants of the invention can be uncharged or cationic, but are preferably cationic. Here, the term "cationic" refers only to the charges located on the main polymer chain. These positive charges have to be balanced by counterions which in the specific embodiments in which the repeating units are substituted by anionic groups such as sulphonate or carboxylate groups can be covalently bound to the polymer chain. In this case, the positive charges of the main polymer chain can be partly or completely balanced by the covalently bound anionic groups. If there are more covalently bound anionic groups than positive charges present, an overall negative charge on the polymer can result, but these are still regarded as cationic polymers for the purposes of the invention, since the positive charges on the main polymer chain are decisive. The positive charges are generally not shown in formulae, since their precise number and position cannot be established unambiguously. However, the number of positive charges is at least 1 and not more than p, where p is the total number of all repeating units, identical or different, present in the polymer.

To balance the positive charge, if this has not already been achieved by (optionally) covalently bound sulphonate- or carboxylate-substituted and thus negatively charged groups, the conductive polymers require anions as counterions.

Counterions can therefore be added to the mixtures. These can be monomeric or polymeric anions, with the latter being referred to as polyanions in the following.

Polyanions used are preferably the anions of polymeric carboxylic acids, such as polyacrylic acids, polymethacrylic acid or polymaleic acids, or the anions of polymeric sulphonic acids such as polystyrenesulphonic acids and polyvinylsulphonic acids. These polycarboxylic and polysulphonic acids can also be copolymers of vinylcarboxylic and vinylsulphonic acids with other polymerizable monomers such as acrylic esters and styrene.

The anion of polystyrenesulphonic acid is particularly preferred as counterion.

The molecular weight of the polyacids providing the polyanions is preferably from 1000 to 2 000 000, particularly preferably from 2000 to 500 000. The polyacids or their alkali metal salts are commercially available, e.g. polystyrenesulphonic acids and polyacrylic acids, or can be prepared by known methods (cf., for example, Houben Weyl, Methoden der organischen Chemie, Vol. E 20 Makromolekulare Stoffe, Part 2, (1987), p. 1141 ff.).

Monomeric anions used are, for example, those of $C_1$-$C_{20}$-alkanesulphonic acids such as methanesulphonic, ethanesulphonic, propanesulphonic, butanesulphonic or higher sulphonic acids such as dodecanesulphonic acid, of aliphatic perfluorosulphonic acids such as trifluoromethanesulphonic acid, perfluorobutanesulphonic acid or perfluorooctanesulphonic acid, of aliphatic $C_1$-$C_{20}$-carboxylic acids such as 2-ethylhexylcarboxylic acid, of aliphatic perfluorocarboxylic acids such as trifluoroacetic acid or perfluorooctanoic acid, and of aromatic, unsubstituted or $C_1$-$C_{20}$-alkyl-substituted sulphonic acids such as benzenesulphonic acid, o-toluenesulphonic acid, p-toluenesulphonic acid or dodecylbenzenesulphonic acid and of cycloalkanesulphonic acids such as camphorsulphonic acid, or tetrafluoroborates, hexafluorophosphates, perchlorates, hexafluoroantimonates, hexafluoroarsenates or hexachloroantimonates.

Preference is given to the anions of p-toluenesulphonic acid, methanesulphonic acid or camphorsulphonic acid.

The counterions are, for example, added to the mixtures in the form of their alkali metal salts or as free acids.

The anions of the oxidant used, which are present in any case, preferably serve as counterions so that addition of additional counterions is not absolutely necessary.

In addition, further components such as one or more organic binders which are soluble in organic solvents, e.g. polyvinyl acetate, polycarbonate, polyvinyl butyrate, polyacrylic esters, polymethacrylic esters, polystyrene, polyacrylonitrile, polyvinyl chloride, polybutadiene, polyisoprene, polyethers, polyesters, silicones, pyrrole-acrylic ester, vinyl acetate-acrylic ester and ethylene-vinyl acetate copolymers, or water-soluble binders such as polyvinyl alcohols, crosslinkers such as polyurethanes or polyurethane dispersions, polyacrylates, polyolefin dispersions, epoxy silanes such as 3-glycidoxypropyltrialkoxysilane, and additives such as surface-active substances can also be added to the mixtures of the invention. Furthermore, alkoxysilane hydrolysates, e.g. hydrolysates based on tetraethoxysilane, can be added to increase the scratch resistance in the case of coatings.

The oxidative polymerization of the precursors for the preparation of conductive polymers theoretically requires 2.25 equivalents of oxidant per mole of thiophene (cf., for example, J. Polym. Sc. Part A Polymer Chemistry Vol. 26, p. 1287 (1988)). However, lower or higher numbers of equivalents of oxidant can also be used.

The mixtures preferably contain from 1 to 30% by weight of the precursors for the preparation of conductive polymers and from 0 to 50% by weight of binders, crosslinkers and/or additives, with both percentages by weight being based on the total weight of the mixture.

The polymerization rate in mixtures containing precursors for the preparation of conductive polymers and at least one oxidant is determined not only by the concentration of the starting materials but also by the reaction constants of the polymerization. The reaction constants k have a temperature dependence given by:

$$k = \nu * e^{-Ea/RT},$$

where $\nu$ is the frequency factor, $E_a$ is the activation energy in J/mol, R is the gas constant=8.3145 $JK^{-1} mol^{-1}$ and T is the temperature in kelvin.

The activation energy is a temperature- and concentration-dependent parameter which influences the reaction rate. A high activation energy leads to relatively slow reactions and thus relatively long pot lives of the mixtures.

The present invention further provides mixtures comprising precursors for the preparation of conductive polymers and at least one oxidant, characterized in that the polymerization of the precursors has an activation energy of 75 kJ/mol or greater, preferably 85 kJ/mol or greater, particularly preferably 95 kJ/mol or greater. Excessively high activation energies can have the disadvantage that the polymerization only starts at very high temperatures, which is a disadvantage for the preparation of conductive polymers. For this reason, the activation energy is preferably less than 200 kJ/mol, particularly preferably less than 150 kJ/mol and very particularly preferably less than 130 kJ/mol.

To determine the activation energy, it is necessary for the concentration profile of starting materials (precursors, oxidants) and products to be determined experimentally. If a model describing the kinetics of the individual reaction substeps is fitted to the concentration profile at various reaction temperatures, the reaction constants for various temperatures are obtained. The activation energy of the reaction can then be determined from the temperature dependence of the reaction constants k using the above formula.

The determination of activation energies and the procedure for carrying out the kinetic measurements for this purpose are known to those skilled in the art and are described, for example, in "Kinetics of homogeneous multistep reactions" by F. G. Helfferich, edited by R. G. Compton and G. Hancock as Volume 38 in the series "Comprehensive Chemical Kinetics" (Elsevier, Amsterdam 2001). For example, Example 11 describes how the activation energies of the polymerization in mixtures containing 3,4-ethylenedioxythiophene as precursor and iron(III) p-toluenesulphonate as oxidant were determined.

The mixtures of the invention can additionally contain solvents, counterions, binders and/or crosslinkers.

Preference ranges, definitions and examples for precursors, counterions, binders, crosslinkers and solvents indicated above apply analogously here.

As oxidant, preference is given to a metal salt of an organic acid or an inorganic acid having organic radicals.

As such metal salts, it is possible to use all metal salts which are known to those skilled in the art as oxidants for the oxidative polymerization of thiophenes, anilines or pyrroles.

Suitable metal salts are metal salts of main group or transition group metals, the latter also referred to in the following as transition metal salts, of the Periodic Table of the Elements of Mendeleev. Preference is given to transition metal salts. Suitable transition metal salts are, in particular, salts of an inorganic or organic acid or an inorganic acid having organic radicals with transition metals, e.g. iron(III), copper(II), chromium(VI), cerium(IV), manganese(IV), manganese(VII), ruthenium(III) and zinc(II).

Preferred transition metal salts are those of iron(III). Iron (III) salts are frequently inexpensive, readily available and easy to handle, e.g. the iron(III) salts of inorganic acids, for example iron(III) halides (e.g. $FeCl_3$) or iron(III) salts of other inorganic acids, e.g. $Fe(ClO_4)_3$ or $Fe_2(SO_4)_3$, iron(III) salts of organic acids and inorganic acids having organic radicals.

Examples of iron(III) salts of inorganic acids having organic radicals are the iron(III) salts of the sulphuric monoesters of $C_1$-$C_{20}$-alkanoles, e.g. the iron(III) salt of lauryl sulphate.

Particularly preferred transition metal salts are those of an organic acid, in particular iron(III) salts of organic acids.

Examples of iron(III) salts of organic acids are: the iron (III) salts of $C_1$-$C_{20}$-alkanesulphonic acids such as methanesulphonic, ethanesulphonic, propanesulphonic, butanesulphonic or higher sulphonic acids, e.g. dodecanesulphonic acid, of aliphatic perfluorosulphonic acids such as trifluoromethanesulphonic acid, perfluorobutanesulphonic acid or perfluorooctanesulphonic acid, of aliphatic $C_1$-$C_{20}$-carboxylic acids such as 2-ethylhexylcarboxylic acid, of aliphatic perfluorocarboxylic acids such as trifluoroacetic acid or perfluorooctanoic acid, and of aromatic, unsubstituted or $C_1$-$C_{20}$-alkyl-substituted sulphonic acids such as benzenesulphonic acid, o-toluenesulphonic acid, p-toluenesulphonic acid or dodecylbenzenesulphonic acid and of cycloalkanesulphonic acids such as camphorsulphonic acid.

It is also possible to use any mixtures of the abovementioned iron(III) salts of organic acids.

The use of the iron(III) salts of organic acids and of the inorganic acids having organic radicals has the great advantage that they are not corrosive.

Very particularly preferred metal salts are iron(III) p-toluenesulphonate, iron(III) o-toluenesulphonate or a mixture of iron(III) p-toluenesulphonate and iron(III) o-toluenesulphonate.

Further suitable metal salts are peroxo compounds such as peroxodisulphates (persulphates), in particular ammonium and alkali metal peroxodisulphates, e.g. sodium and potassium peroxodisulphate, or alkali metal perborates and transition metal oxides, e.g. manganese(IV) oxide or cerium(IV) oxide.

In preferred embodiments, the mixtures of the invention contain an oxidant which is obtainable by the novel process described above.

In further, preferred embodiments, the mixtures of the invention contain substituted or unsubstituted thiophenes, pyrroles, anilines or derivatives thereof as precursors for the preparation of conductive polymers. Particular preference is given to substituted or unsubstituted 3,4-ethylenedioxythiophenes or derivatives thereof, very particularly preferably 3,4-ethylenedioxythiophene.

In further, preferred embodiments, the mixtures of the invention contain an iron(III) salt, preferably iron(III) p-toluenesulphonate, iron(III) o-toluenesulphonate or a mixture of iron(III) p-toluenesulphonate and iron(III) o-toluenesulphonate, as oxidant.

In further, preferred embodiments, water is subsequently added to the mixtures of the invention in an amount of preferably from 1 to 100% by weight, particularly preferably from 1 to 60% by weight, very particularly preferably from 1 to 40% by weight, based on the weight of the oxidant.

The mixtures of the invention can also be formed in situ on a surface, for example by sequential dipping into an oxidant, if appropriate in the form of a solution, and into precursors, if appropriate in the form of a solution, with drying being able, if appropriate, to follow each dipping step. The mixtures are then formed, for example, by interfacial diffusion or mixing of various liquid phases on the surface. These mixtures, too, are to be regarded a mixtures according to the invention.

The mixtures of the invention can be used to produce electrolytic capacitors. In principle, an electrolytic capacitor is produced by firstly coating an oxidizable metal with a dielectric, i.e. an oxide layer, by oxidative means, for example by electrochemical oxidation. A conductive polymer which forms the solid electrolyte is then deposited chemically on top of the dielectric by means of oxidative polymerization, according to the invention by means of one of the above-described mixtures. Further highly conductive layers such as graphite and silver serve to conduct away the electric current. Finally, the capacitor body is provided with contacts and encapsulated.

In the process of the invention, the "oxidizable metal" preferably forms an anode body having a large surface area, e.g. in the form of a porous sintered body or a roughened foil. In the following, this will also be referred to as anode body for short.

The solid electrolyte comprising a conductive polymer is, according to the invention, produced on the anode body covered with an oxide layer by means of oxidative polymerization of the above-described mixtures, by applying these mixtures, preferably in the form of solutions, to the oxide layer of the anode body and carrying out the oxidative polymerization to completion, if appropriate with heating of the coating, depending on the activity of the oxidant used.

The present invention therefore likewise provides a process for producing an electrolytic capacitor, characterized in that the mixtures of the invention, if appropriate in the form of solutions, are applied to an oxide layer of a metal and are polymerized by chemical oxidation at temperatures of from $-10°$ C. to $250°$ C. to form the corresponding polymers.

The present invention further provides a process for producing an electrolytic capacitor, characterized in that precursors for the preparation of conductive polymers and the oxidants obtainable according to the invention are applied successively, if appropriate in the form of solutions, to an oxide layer of a metal and are polymerized by chemical oxidation at temperatures of from $-10°$ C. to $250°$ C. to form the corresponding polymers.

The application to the oxide layer of the anode body can be carried out directly or using a coupling agent, for example a silane, and/or another functional layer.

The oxidative chemical polymerization of the precursors for the preparation of conductive polymers is generally carried out at temperatures of from $-10°$ C. to $250°$ C., preferably at temperatures of from $0°$ C. to $200°$ C., depending on the oxidant used and the desired reaction time.

Like the mixtures of the invention, additional counterions can also be added to the solutions. Suitable counterions are those which have been mentioned above for the mixtures of the invention.

For use in the electrolytic capacitors according to the invention, particular preference is given to the anions of monomeric alkanesulphonic or cycloalkanesulphonic acids or aromatic sulphonic acids, since solutions containing these are better able to penetrate into the porous anode material and thus give a larger contact area between the latter and the solid electrolyte.

In addition, for use in the electrolytic capacitors according to the invention, the anions of the oxidant used which may be present preferably serve as counterions, so that addition of additional counterions is not absolutely necessary.

Like the mixtures of the invention, the solutions, too, can additionally contain one or more binders, crosslinkers and/or additives. Suitable binders, crosslinkers and/or additives are those mentioned above for the mixtures of the invention.

Suitable precursors for the preparation of conductive polymers are those mentioned above.

The mixtures of the invention are applied to the oxide layer of the anode body by known methods, e.g. by steeping, casting, dribbling, spraying, doctor blade coating, painting or printing.

Removal of any solvent used after application of the mixtures can be achieved by simple evaporation at room temperature. However, to achieve higher processing speeds, it is more advantageous to remove the solvents at elevated temperatures, e.g. at temperatures of from 20 to $300°$ C., preferably from 40 to $250°$ C. Thermal after-treatment can be carried out immediately together with the removal of the solvent or else after a time interval after production of the coating.

The duration of the heat treatment is from 5 seconds to a number of hours, depending on the type of polymer used for the coating. Temperature profiles with different temperatures and residence times can also be used for the thermal treatment.

The heat treatment can be carried out, for example, by moving the coated anode bodies through a heated chamber maintained at the desired temperature at such a rate that the desired residence time at the chosen temperature is achieved, or bringing it into contact with a hotplate maintained at the desired temperature for the desired residence time. Furthermore, the heat treatment can, for example, be carried out in an oven or a plurality of ovens which are each at different temperatures.

After removal of the solvents (drying) and, if applicable, after the thermal after-treatment, it can be advantageous to wash the excess oxidant and residual salts out of the coating by means of a suitable solvent, preferably water or alcohols. Residual salts are in this context the salts of the reduced form of the oxidant and any further salts present.

Depending on the type of anode body, it can be advantageous to impregnate the anode body a number of further times, preferably after washing, in order to obtain thicker polymer layers.

After the polymerization and preferably during or after washing, it can be advantageous to reform the oxide film by electrochemical means to mend any defects in the oxide film and thereby reduce the leakage current of the finished capacitor (reforming).

Furthermore, a preferred process is characterized in that the oxidizable metal is a valve metal or a compound having comparable properties.

For the purposes of the invention, valve metals are metals whose oxide layers do not allow electric current to flow equally well in both directions: in the case of an anodically applied voltage, the oxide layers of the valve metals block the flow of electric current, while a cathodically applied voltage results in large currents which can destroy the oxide layer. Valve metals include Be, Mg, Al, Ge, Si, Sn, Sb, Bi, Ti, Zr, Hf, V, Nb, Ta and W and also alloys or compounds of at least one of these metals with other elements. The best known representatives of valve metals are Al, Ta and Nb. Compounds having comparable properties are those which have metallic conductivity, are oxidizable and whose oxide layers have the above-described properties. For example, NbO possesses metallic conductivity but is generally not regarded as a valve metal. However, layers of oxidized NbO display the typical properties of valve metal oxide layers, so that NbO and alloys or compounds of NbO with other elements are typical examples of compounds of this type having comparable properties.

Accordingly, the term "oxidizable metal" encompasses not only metals but also alloys or compounds of a metal with other elements, as long as they possess metallic conductivity and are oxidizable.

A particularly preferred process according to the present invention is therefore a process which is characterized in that the valve metal or the compound having comparable properties is tantalum, niobium, aluminium, titanium, zirconium, hafnium, vanadium, an alloy or compound of at least one of these metals with other elements, NbO or an alloy or compound of NbO with other elements.

In the process of the invention, the "oxidizable metal" preferably forms an anode body having a large surface area, e.g. in the form of a porous sintered body or a roughened foil.

However, the process of the invention is not only suitable for producing electrolytic capacitors but is likewise suitable for producing conductive layers for other applications.

According to the invention, the layers are produced by a process which forms the conductive layers by oxidative polymerization of the mixtures of the invention.

The present invention therefore likewise provides a process for producing electrically conductive layers, characterized in that the mixtures of the invention, preferably in the form of solutions, are applied to a substrate and are polymerized chemically on this substrate at temperatures of from $-10°$ C. to $250°$ C., preferably at temperatures of from $0°$ C. to $200°$ C., to form conductive polymers.

The present invention further provides a process for producing conductive layers, characterized in that precursors for the preparation of conductive polymers and oxidants obtainable according to the invention are applied successively, if appropriate in the form of solutions, to a substrate and are polymerized on this substrate by chemical oxidation at temperatures of from $-10°$ C. to $250°$ C. to form the corresponding conductive polymers.

Illustrative and preferred reaction conditions, molar ratios, percentages by weight, solvents, oxidants, precursors for the preparation of conductive polymers and variants or specifics described in connection with these for carrying out the oxidative polymerization correspond to those described above for the production of electrolytic capacitors.

In the case of flat substrates, it is possible to use not only the application methods indicated for capacitors but also, in particular, application of the mixtures or solutions by spin coating.

Like the mixtures of the invention, the solutions, too, can additionally contain one or more binders, crosslinkers and/or additives. Suitable binders, crosslinkers and/or additives are those mentioned above for the mixtures of the invention.

As in the case of the mixtures of the invention, additional counterions can also be added to the solutions. Suitable counterions are those mentioned above for the mixtures of the invention, with polyanions being able to lead to improved film formation properties in the formation of polymer films and therefore be preferred.

The electrically conductive layers produced according to the invention can also, as in the case of the electrolytic capacitors, be washed with suitable solvents after polymerization and, if appropriate, after drying in order to remove excess oxidant and residual salts.

The substrate can be, for example, glass, flexible glass or a plastic.

Particularly suitable plastics are: polycarbonates, polyesters such as PET and PEN (polyethylene terephthalate and polyethylene naphthenate, respectively), copolycarbonates, polysulphone, polyether sulphone, polyimide, polyethylene, polypropylene or cyclic polyolefins or cyclic olefin copolymers (COCs), hydrogenated styrene polymers or hydrogenated styrene copolymers.

Suitable polymer substrates are, for example, films such as polyester films, PES films from Sumitomo or polycarbonate films from Bayer AG (Makrofol®).

The conductive layers produced according to the invention can remain on the substrate or be detached from this.

Depending on the application, the polythiophene layers have a thickness of from 1 nm to 100 µm, preferably from 10 nm to 10 µm, particularly preferably from 50 nm to 1 µm.

The layers produced according to the invention are highly suitable for use as antistatic coating, as transparent heating, as transparent or opaque electrodes, as hole-injecting or hole-conducting layers in organic light-emitting diodes, for producing plated-through holes in printed circuit boards or as solid electrolyte in electrolytic capacitors. They can advantageously be transparent.

As antistatic coatings, they can, for example, be used on films, packaging for electronic components, for antistatic finishing of polymer films and for coating VDUs. Furthermore, they can be used as cathode materials in capacitors, as transparent electrodes in, for example, displays, for example as substitutes for indium tin oxide electrodes, or as electric conductors in polymer electronics. Further possible uses are in sensors, batteries, solar cells, electrochromic windows (smart windows) and displays and also for corrosion protection.

The present invention further provides for the use of the oxidants prepared according to the invention or by the process of the invention and also the mixtures of the invention for producing conductive layers and electrolytic capacitors.

Figure 1:
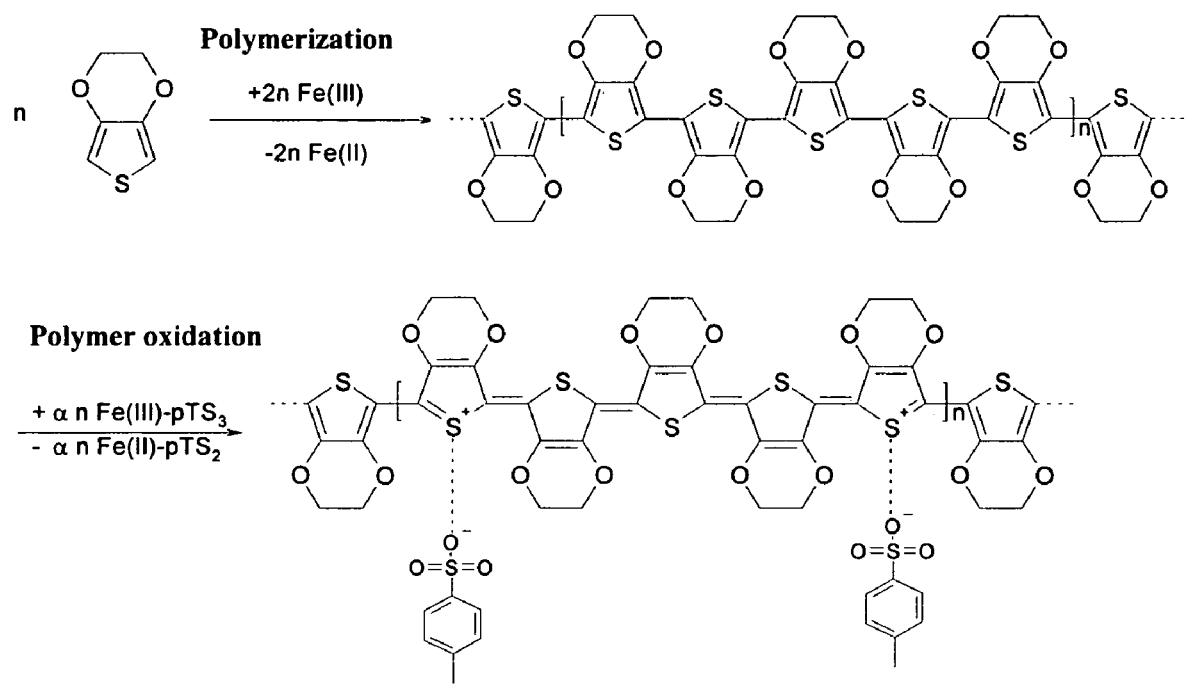
FIG. 1: illustrates the reaction scheme for the oxidative polymerization of EDT by means of iron(III) p-toluenesulphonate to form conductive poly(3,4-ethylenedioxythiophene).

The following examples are not to be regarded as a restriction.

EXAMPLES

Example 1 a) Preparation of a Solution of an Oxidant According to the Invention

Two parts by volume of a 40% strength solution of iron(III) p-toluenesulphonate in ethanol and one part by volume of the weakly basic, macroporous anion exchanger Lewatit® MP 62 (Bayer AG) were measured out separately using a volume-measuring vessel. The solid anion exchanger was measured out by simple pouring (the parts by volume of the solid anion exchangers in the following examples were also measured out in this way). The measured volumes of ethanolic solution of iron(III) p-toluenesulphonate and of anion exchanger were subsequently mixed in a closed container for 24 hours by means of a shaker. The anion exchanger was then filtered off.

b) Preparation of a Mixture According to the Invention of Oxidant and Precursor 1 part by weight of 3,4-ethylenedioxythiophene (BAYTRON® M, H.C. Starck GmbH) and 20 parts by weight of the solution of the oxidant according to the invention prepared as described under a) were mixed with stirring and the resulting mixture was stored at about 6° C. in a refrigerator. At regular intervals, a lamp was shone through a thin solution film of the mixture according to the invention and the film was visually examined for solid particles. The time interval between the time when the mixture was made up and the time at which the first particles became visible was defined as the pot life.

A pot life of 24 hours was found.

Example 2

Various amounts of anion exchangers were added to a 40% strength solution of iron(III) p-toluenesulphonate in ethanol using a procedure analogous to Example 1 and the pot life of mixtures with 3,4-ethylenedioxythiophene was subsequently determined.

a) Preparation of Solutions of Oxidants According to the Invention

For this purpose, a 40% strength by weight ethanolic solution of iron(III) p-toluenesulphonate was mixed in a volume ratio of 9:1, 3:1 and 2:1 with the weakly basic, macroporous anion exchanger Lewatit® MP 62 (Bayer AG) by means of a shaker for 7 hours in each case, and the anion exchanger was subsequently filtered off.

b) Preparation of Mixtures According to the Invention of Oxidant and Precursor

A mixture of one part by weight of 3,4-ethylenedioxythiophene (BAYTRON® M, H.C. Starck GmbH) and 20 parts by weight of the solutions of the oxidants according to the invention prepared as described under a) was prepared and the respective mixture was stored at about 6° C. in a refrigerator. The pot life was determined as described in Example 1.

c) Preparation of a Comparative Mixture which is not According to the Invention from oxidant which has not been Treated with an Ion Exchanger and Precursor For comparison, a mixture of one part by weight of 3,4-ethylenedioxythiophene (BAYTRON® M, H.C. Starck GmbH) and 20 parts by weight of a 40% strength by weight ethanolic solution of iron(III) p-toluenesulphonate which had not been treated with an ion exchanger was prepared, this was stored at about 6° C. and likewise examined by the method described above (reference).

The following measured values were obtained:

| | Volume ratio Oxidant: MP 62 | | | |
|---|---|---|---|---|
| | 9:1 | 3:1 | 2:1 | Reference |
| Pot life | 2 h | 4 h | 24 h | 9 min |

The mixtures according to the invention have a significantly longer pot life than the mixture with iron(III) p-toluenesulphonate which has not been treated with an ion exchanger.

Example 3

To determine the conductivity of polymer films produced from the mixtures according to the invention, films were produced from the mixtures by spin coating and subsequently polymerized.

a) Preparation of a Solution of an Oxidant According to the Invention

For this purpose, a 40% strength by weight butanolic solution of iron(III) p-toluenesulphonate was mixed in a volume ratio of 2:1 with the weakly basic, macroporous anion exchanger Lewatit® MP 62 (Bayer AG) using a procedure analogous to Example 1 and the mixture was allowed to stand for 64 hours. The anion exchanger was subsequently filtered off.

b) Preparation of a Mixture According to the Invention of Oxidant and Precursor and also a Conductive Coating A mixture of one part by weight of 3,4-ethylenedioxythiophene (BAYTRON® M, H.C. Starck GmbH) and 20 parts by weight of the solution of the oxidant according to the invention prepared as described under a) was prepared and one part of this mixture was applied to a glass microscope slide (26 mm*26 mm*1 mm) by means of a spin coater (Chemat Technology KW-4A) at 2000 rpm for 5 seconds. The specimen was dried at 20° C. for 60 minutes and subsequently washed with methanol for 15 minutes in a glass dish. The specimen was then dried at 50° C. for 15 minutes and the surface resistance was subsequently determined by means of a four-point measurement using a Keithley 199 Multimeter. The layer thickness was determined using a Tencor Alpha Step 500 Surface Profiler. The specific conductivity was determined from the surface resistance and layer thickness. The rest of the mixture was stored at about 6° C. in a refrigerator and the pot life was determined on this, as described in Example 1.

c) Preparation of a Comparative Mixture which is not According to the Invention from Oxidant which has not been Treated with an Ion Exchanger and Precursor For comparison, a mixture of one part by weight of 3,4-ethylenedioxythiophene (BAYTRON® M, H.C. Starck GmbH) and 20 parts by weight of a 40% strength by weight butanolic solution of iron(III) p-toluenesulphonate which had not been treated with an ion exchanger was prepared, this was stored at 6° C. and likewise examined by the method described above (reference).

The following measured values were obtained:

| | Volume ratio of oxidant: MP 62 | |
| --- | --- | --- |
| | 2:1 | Reference |
| Surface resistance | 77 Ω/square | 145 Ω/square |
| Layer thickness | 230 nm | 305 nm |
| Specific conductivity | 565 S/cm | 226 S/cm |
| Pot life | 48 h | 18 min |

The mixture according to the invention has a significantly longer pot life than the mixture with oxidant which has not been treated with an ion exchanger. At the same time, the conductivity of the layer is significantly greater and the surface resistance is significantly lower than in the case of the specimen which has been produced from the reference mixture.

Example 4

The pot life of a mixture according to the invention was determined in comparison with a mixture of a metal salt which has not been treated with an ion exchanger with addition of base.

a) Preparation of a Solution of an Oxidant According to the Invention

For this purpose, a 40% strength by weight butanolic solution of iron(III) p-toluenesulphonate was mixed in a volume ratio of 2:1 with the weakly basic, macroporous anion exchanger Lewatit® MP 62 (Bayer AG) using a procedure analogous to Example 1 and the mixture was allowed to stand for 64 hours. The anion exchanger was subsequently filtered off.

b) Preparation of a Mixture According to the Invention of Oxidant and Precursor

A mixture of one part by weight of 3,4-ethylenedioxythiophene (BAYTRON® M, H.C. Starck GmbH) and 20 parts by weigh of the solution of the oxidant according to the invention prepared as described under a) was prepared. The mixture was stored at about 6° C. in a refrigerator and the pot life was determined on this, as described in Example 1.

c) Preparation of a Comparative Mixture which is not According to the Invention from Oxidant which has not been Treated with an Ion Exchanger and Precursor For comparison, a mixture of one part by weight of 3,4-ethylenedioxythiophene (BAYTRON® M, H.C. Starck GmbH) and 20 parts by weight of a 40% strength by weight butanolic solution of iron(III) p-toluenesulphonate and 0.75 part by weight of imidazole which had not been treated with an ion exchanger was prepared, this was stored at about 6° C. and likewise examined by the method described above (reference).

The following pot lives were obtained:

| | Volume ration of oxidant: MP 62 | |
| --- | --- | --- |
| | 2:1 | Reference |
| Pot life | 48 h | 3 h |

Polymer films could be produced from the above two mixtures by applying the mixture to a glass plate and drying at 60° C. However, in the case of reference mixtures with larger additions of imidazole, polymer films could no longer be produced even at temperatures of 150° C.

The mixture according to the invention has a significantly longer pot life than the mixture with oxidant which has not been treated with an ion exchanger and addition of the base imidazole.

Example 5

The pot life of a mixture according to the invention containing two oxidants according to the invention which had been prepared in different ways was determined.

a) Preparation of Two Solutions of Oxidant According to the Invention

For this purpose, a 40% strength by weight ethanolic solution of iron(III) p-toluenesulphonate was mixed in a volume ratio of 1:1 with the weakly basic, macroporous anion exchanger Lewatit® MP 62 (Bayer AG) for 7 hours by means of a shaker using a procedure analogous to Example 1, and the anion exchanger was subsequently filtered off (solution 1).

A second solution was prepared analogously by mixing a 40% strength by weight ethanolic solution of iron(III) p-toluenesulphonate in a volume ratio of 2:1 with the weakly basic, macroporous anion exchanger Lewatit® MP 62 (Bayer AG) for 7 hours by means of a shaker, and subsequently filtering off the anion exchanger (solution 2).

b) Preparation of a Mixture According to the Invention of Oxidant and Precursor

A mixture according to the invention of one part by weight of 3,4-ethylenedioxythiophene (BAYTRON® M, H.C. Starck GmbH), 10 parts by weight of solution 1 and 10 parts by weight of solution 2 was prepared and the mixture was stored at about 6° C. in a refrigerator. The pot life was determined in a manner analogous to that described in Example 1.

A pot life of 96 hours was obtained.

| | |
| --- | --- |
| Surface resistance | 974 Ω/square |
| Layer thickness | 155 nm |
| Specific conductivity | 66 S/cm |
| Pot life | 96 h |

As this example shows, the pot life can also be adjusted by mixing oxidants according to the invention which have been prepared in different ways.

Example 6

The pot life of a mixture according to the invention when stored at low temperature was determined.

a) Preparation of a Solution of an Oxidant According to the Invention

For this purpose a 40% strength by weight ethanolic solution of iron(III) p-toluenesulphonate was mixed in a volume ratio of 2:1 with the weakly basic, macroporous anion exchanger Lewatit® MP 62 (Bayer AG) for 7 hours by means of a shaker using a procedure analogous to Example 1, and the anion exchanger was subsequently filtered off.

b) Preparation of a Mixture According to the Invention of Oxidant and Precursor

A mixture of one part by weight of 3,4-ethylenedioxythiophene (BAYTRON® M, H.C. Starck GmbH) and 20 parts by weight of the solution of the oxidant according to the invention prepared as described under a) was prepared and the mixture was stored at about −15° C. in a freezer. The mixture remained liquid at this temperature. The pot life was determined as described in Example 1.

c) Preparation of a Comparative Mixture which is not According to the Invention from Oxidant which has not been Treated with an Ion Exchanger and Precursor For comparison, a mixture of one part by weight of 3,4-ethylenedioxythiophene (BAYTRON® M, H.C. Starck GmbH) and 20 parts by weight of 40% strength by weight ethanolic solution of iron(III) p-toluenesulphonate which had not been treated with an ion exchanger was prepared, this was stored at −15° C. and likewise examined by the method described above (reference).

The following measured values were obtained (for comparison, the corresponding pot lives for storage at 6° C. from Example 2 are also shown):

|  | Volume ratio of oxidant: MP 62 | |
| --- | --- | --- |
|  | 2:1 | Reference |
| Pot life at −15° C. | 96 h | 2 h |
| Pot life at 6° C. (Example 2) | 24 h | 9 min |

As comparison of the pot lives at different storage temperatures shows, the pot life can be significantly increased by cooling to low temperatures both in the case of the mixture according to the invention and also in the case of the reference. However, the mixtures according to the invention have far longer pot lives than mixtures containing iron(III) p-toluenesulphonate which has not been treated with an ion exchanger, even at low temperatures.

Example 7

The pot lives of mixtures according to the invention containing oxidants according to the invention which had been prepared using different anion exchangers.

a) Preparation of Solutions of the Oxidants According to the Invention

For this purpose, a 40% strength by weight butanolic solution of iron(III) p-toluenesulphonate was mixed in a volume ratio of 2:1 with the weakly basic, macroporous anion exchanger Lewatit® MP 62 (Bayer AG) using a procedure analogous to Example 1 and the mixture was allowed to stand for 24 hours. The anion exchanger was subsequently filtered off. Oxidants according to the invention were prepared analogously by treating the iron(III) p-toluenesulphonate solution with the intermediate-basicity, macroporous anion exchanger Lewatit® MP 64 (Bayer AG) or the strongly basic, macroporous anion exchanger Lewatit® MP 600 WS (Bayer AG).

b) Preparation of the Mixtures According to the Invention of Oxidant and Precursor A mixture of one part by weight of 3,4-ethylenedioxythiophene (BAYTRON® M, H.C. Starck GmbH) and 20 parts by weight of the solution of the oxidant according to the invention was prepared as described under a) and stored at 6° C. in a refrigerator. The pot life was determined in a manner analogous to that described in Example 1.

Using an analogous procedure, mixtures with the solutions prepared by the same treatment with the intermediate-basicity, macroporous anion exchanger Lewatit® MP 64 (Bayer AG) or the strongly basic, macroporous anion exchanger Lewatit® MP 600 WS (Bayer AG) as described under a) were prepared, stored at 6° C. and the samples were likewise examined analogously.

c) Preparation of a Comparative Mixture which is not According to the Invention of Oxidant which has not been Treated with an Ion Exchanger and Precursor For comparison of a mixture of one part by weight of 3,4-ethylenedioxythiophene (BAYTRON® M, H.C. Starck GmbH) and 20 parts by weight of a 40% strength by weight butanolic solution of iron(III) p-toluenesulphonate which had not been treated with an ion exchanger was prepared, stored at 6° C. and likewise examined by the methods described above (reference).

The following measured values were obtained:

|  | Ion exchanger | | | |
| --- | --- | --- | --- | --- |
|  | MP 62 | MP 64 | MP 600 WS | Reference |
| Pot life | 16 h | 16 h | 2 h | 18 min |

Example 8

A solution of an oxidant according to the invention having a low water content and a high storage stability was prepared.

a) Preparation of a Solution of an Oxidant According to the Invention having a Low Water Content For this purpose, 1 l of the weakly basic, macroporous anion exchanger Lewatit® MP 62 (Bayer AG) was admixed with 2 l of absolute ethanol and stirred for 6 hours. The ion-exchange resin was subsequently separated off by means of a sieve and conditioned as described another three times.

A 40% strength by weight ethanolic solution of iron(III) p-toluenesulphonate was subsequently mixed in a volume ratio of 2:1 (based on the volume of the ion exchanger before treatment with ethanol) with the weakly basic, macroporous anion exchanger Lewatit® MP 62 (Bayer AG) for 7 hours by means of a shaker using a procedure analogous to Example 1, and the anion exchanger was subsequently filtered off.

b) Preparation of a Solution of an Oxidant According to the Invention without Pre-Treatment of the Ion Exchanger A 40% strength by weight ethanolic solution of iron(III) p-toluenesulphonate was mixed in a volume ratio of 2:1 with the weakly basic, macroporous anion exchanger Lewatit® MP 62 (Bayer AG) for 7 hours by means of a shaker using a procedure analogous to Example 1, and the anion exchanger was subsequently filtered off.

The solution of the oxidant according to the invention prepared as described under a) had a water content of 1.1% by weight based on the total weight of the solution and the solution formed no precipitates after storage at room temperature (20° C.) for three months.

The solution of the oxidant according to the invention prepared as described under b) had a water content of 12.8% by weight based on the total weight of the solution. The solution formed precipitates after being stored at room temperature for one week, while precipitates were formed after two months when the solution was stored at about 6° C. in a refrigerator.

Example 9

The pot life of a mixture according to the invention containing an oxidant according to the invention having a low water content was determined.

a) Preparation of a Mixture According to the Invention of Oxidant and Precursor

A mixture of one part by weight of 3,4-ethylenedioxythiophene (BAYTRON® M, H.C. Starck GmbH) and 20 parts by weight of the solution of the oxidant according to the invention prepared as described under Example 8a) was prepared. The mixture was stored at about 6° C. in a refrigerator and the pot life of this was determined as described in Example 1.

b) Preparation of a Mixture According to the Invention of Oxidant and Precursor with Addition of Water A mixture of one part by weight of 3,4-ethylenedioxythiophene (BAYTRON® M, H.C. Starck GmbH), 20 parts by weight of the solution of the oxidant according to the invention prepared as described under Example 8a) and 2 parts of water was prepared. The mixture was stored at about 6° C. in a refrigerator and the pot life of this was determined as described in Example 1.

The mixture according to the invention from a) had a pot life of 2.5 hours, while the mixture according to the invention from b) had a pot life of 30 hours.

Example 10

Production of Capacitors Using the Oxidants According to the Invention

Tantalum powder having a specific capacitance of 50 000 µFV/g was pressed to form pellets and sintered to give a porous, cylindrical body having a diameter of 2.5 mm and a height of 1.9 mm. The pellets (anodes) were anodized at 30 V in a phosphoric acid electrolyte.

A 40% strength by weight ethanolic solution of iron(III) p-toluenesulphonate was mixed in a volume ratio of 2:1 with the weakly basic, macroporous anion exchanger Lewatit® MP 62 (Bayer AG) for 7 hours by means of a shaker using a procedure analogous to Example 1, and the anion exchanger was subsequently filtered off.

A mixture of one part by weight of 3,4-ethylenedioxythiophene (BAYTRON® M, H.C. Starck GmbH) and 20 parts by weight of the solution of the oxidant according to the invention prepared as described under a) was prepared.

The mixture according to the invention was used for impregnating the anode pellets. The anode pellets were steeped in this mixture and subsequently dried for 15 minutes at room temperature, for 15 minutes at 50° C. and for 15 minutes at 150° C. After the heat treatment, the mixture in the pellets had polymerized. The pellets were subsequently washed in methanol for 30 minutes. The steeping and washing described was carried out two more times. The pellets were finally coated with a graphite layer and a silver layer.

The same procedure was carried out on fresh pellets using the same mixture according to the invention after the mixture had aged for 24 hours and had been stored at 6° C. during this time.

After the mixture according to the invention had aged for 72 hours and had been stored at 6° C. during this time, the mixture was filtered and the procedure was carried out again on fresh pellets.

The capacitors had the following electrical properties:

| | Mixture | | |
| --- | --- | --- | --- |
| | Fresh mixture | 24 h old mixture | 72 h old mixture |
| Capacitance | 67 µF | 67 µF | 65 µF |
| Equivalent series resistance | 63 mΩ | 57 mΩ | 61 mΩ |

The capacitance was determined at 120 Hz and the equivalent series resistance was measured at 100 kHz by means of an LCR meter (Agilent 4284A). No significant difference in the electrical properties are found.

Example 11

Determination of the Activation Energy of Mixtures According to the Invention and not According to the Invention The method of determining the activation energies of the polymerizations in mixtures containing 3,4-ethylenedioxythiophene as precursor and iron(III) p-toluenesulphonate as oxidant is described below. A comparison between mixtures containing untreated iron(III) p-toluenesulphonate and iron(III) p-toluenesulphonate which had been treated according to the invention with ion exchangers was carried out.

Kinetic Model of the Polymerization of 3,4-ethylenedioxythiophene using Iron(III) p-toluene-sulphonate The reaction of 3,4-ethylenedioxythiophene (EDT) with iron(III) p-toluenesulphonate was followed by means of the EDT, Fe(III) and Fe(II) concentrations in solutions of the reactive mixture. Since the product poly(3,4-ethylenedioxythiophene) is insoluble and precipitates from the solution, its concentration cannot be monitored directly.

To determine the change in the concentrations over time, reactive mixtures of EDT and alcoholic solutions of Fe(III) p-toluenesulphonate were made up and the mixture was stored in stirred, temperature-controlled, closed containers. A sample was taken at regular intervals and the EDT, Fe(III) and Fe(II) contents were determined on this. The EDT concentrations were determined by means of HPLC (high performance liquid chromatography). Iron(II) and iron(III) concentrations were determined photometrically.

The reaction scheme for the oxidative polymerization of EDT by means of iron(III) p-toluene-sulphonate to form conductive poly(3,4-ethylenedioxythiophene) is shown in FIG. 1.

FIG. 1: Reaction scheme for the oxidative polymerization of EDT by means of iron(III) p-toluenesulphonate to form conductive poly(3,4-ethylenedioxythiophene).

This reaction can be described by the following substeps:

Monomer Oxidation $$r_0 = k_0 c_{EDT}^2 c_{Fe^{III}}^2 + k_{01} c_{H^+} c_{EDT} c_{Fe^{III}}$$

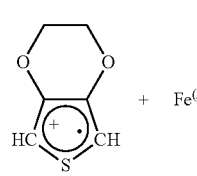

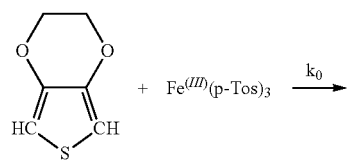

$k_{01}$ describes a reaction acceleration caused by the acid liberated in the oxidation.

End-Group Oxidation $$r_1 = k_1 c_{polymer} c_{Fe^{III}} + k_{11} c_{H^+} c_{polymer} c_{Fe^{III}}$$

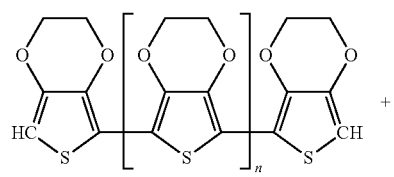

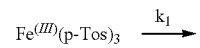

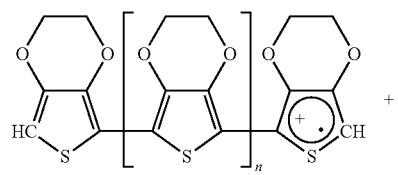

$k_{11}$ describes a reaction acceleration caused by the acid liberated in the oxidation.

Chain Growth by Free Radical (Cation) Combination and Deprotonation $$r_2 = k_2 c_{radical}^2$$

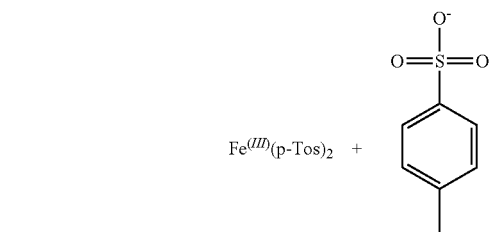

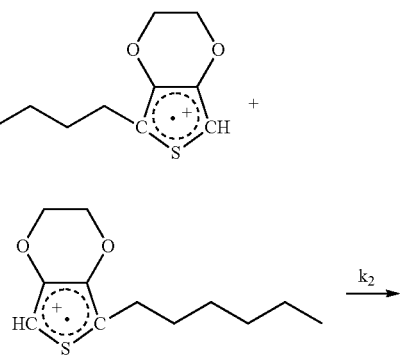

Polymer Oxidation $$r_D = k_D c_{Fe^{III}} (c_{repeating\ units} - c_{oxidation\ sites})$$

$$r_{-D} = k_{-D} c_{Fe^{II}} c_{oxidation\ sites}$$

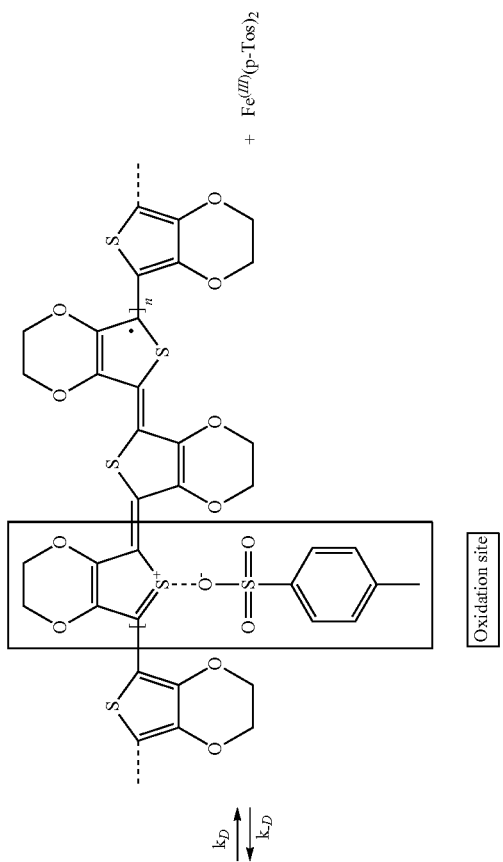
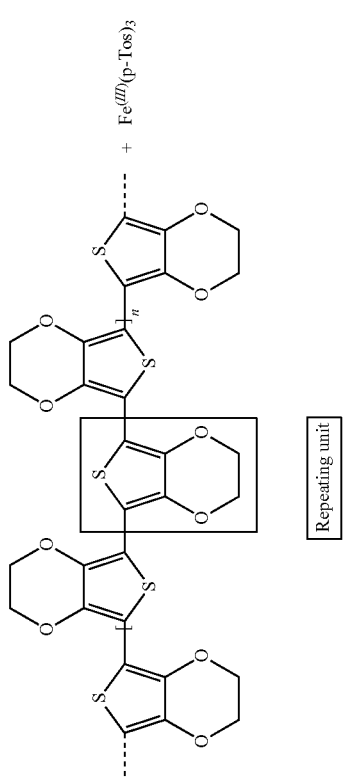

The experimentally determined reaction constants for the oxidative polymerization of EDT by means of iron(III) p-toluenesulphonate to form oxidized poly-3,4-ethylenedioxythiophene at 30° C. are shown in the following Table.

| Reaction substep | Reaction constant | |
|---|---|---|
| Monomer oxidation | $k_0$ | 0.15 $l^3 mol^{-3} h^{-1}$ |
| | $k_{01}$ | 0.026 $l^2 mol^{-2} h^{-1}$ |
| End-group oxidation | $k_1$ | 3000 $l^1 mol^{-1} h^{-1}$ |
| | $k_{11}$ | $10^5$ $l^2 mol^{-2} h^{-1}$ |
| Free radical combination | $k_2$ | $10^9$ $l^1 mol^{-1} h^{-1}$ |
| Polymer oxidation | $k_D$ | 0.5 $l^1 mol^{-1} h^{-1}$ |
| | $k_{-D}$ | 0.1 $l^1 mol^{-1} h^{-1}$ |

The rate-determining reaction step is monomer oxidation ($k_0$).

Figure 2:
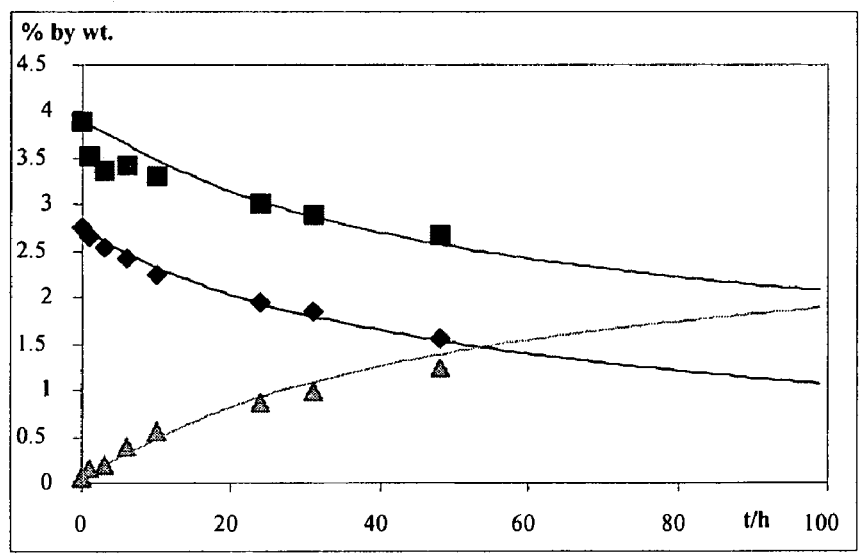
FIG. 2: represents a comparison of experimental data of the concentration curves for EDT (■ square), Fe(III) (♦ lozenge) and Fe(II) (▲ triangle) at 30° C. with the simulation based on the model (continuous lines).

The changes in the concentrations of EDT, Fe(III) and Fe(II) over time for different starting concentrations can be described very well by means of the constants from the above Table. FIG. 2 shows by way of example a comparison between the experimental curve and the simulation based on the model.

FIG. 2: Comparison of experimental data of the concentration curves for EDT (■ square), Fe(III) (♦ lozenge) and Fe(II) (▲ triangle) at 30° C. with the simulation based on the model (continuous lines).

Determination of the Activation Energy for the Polymerization of 3,4-ethylenedioxythiophene Using Untreated Iron(III) p-toluenesulphonate To determine the activation energy, the change in concentration over time was determined at various temperatures (10° C., 20° C., 30° C., 40° C., 50° C.) and the rate-determining reaction constant $k_0$ was in each case fitted to the data. From the Arrhenius plot (see FIG. 3), the activation energy was determined as 67 kJ/mol and the frequency factor was determined as $5.2 \times 10^{10}$ $l^3 mol^{-3} h^{-1}$.

Figure 3:
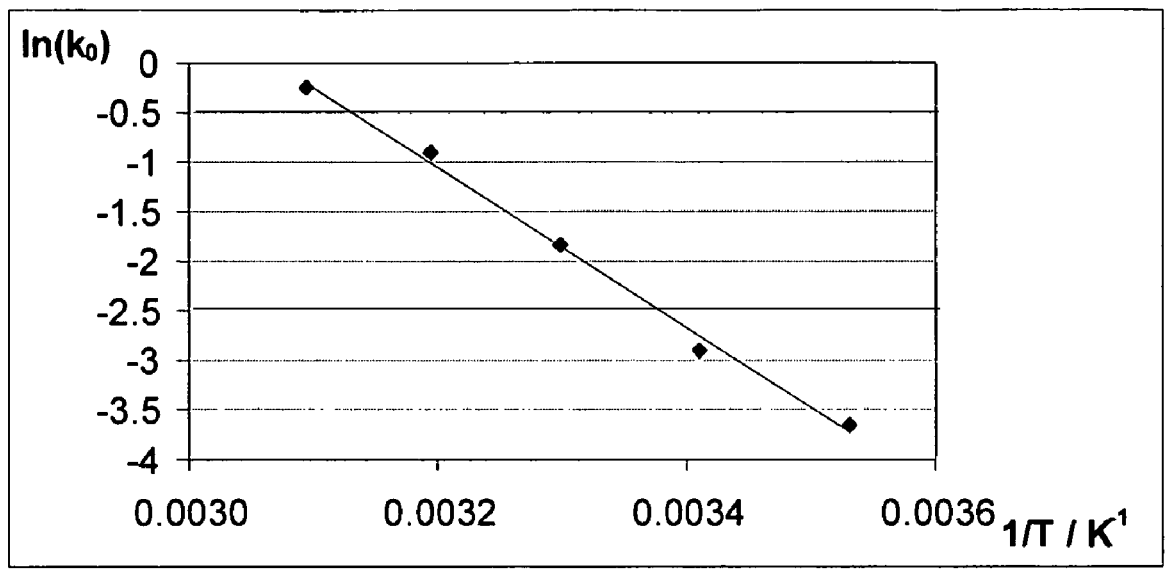
FIG. 3: is an Arrhenius plot of the rate constant $k_0$ (symbols ♦: experimental data, line: simulation).

FIG. 3: Arrhenius plot of the rate constant $k_0$ (symbols ♦: experimental data, line: simulation).

Determination of the Activation Energy for the Polymerization of 3,4-ethylenedioxythiophene in Mixtures According to the Invention A mixture according to the invention of 6.3 parts by weight of 3,4-ethylenedioxythiophene (BAYTRON® M, H.C. Starck GmbH), 85.2 parts by weight of the solution of the oxidant according to the invention prepared as described under Example 8a) and 8.5 parts by weight of water was prepared.

Figure 4:
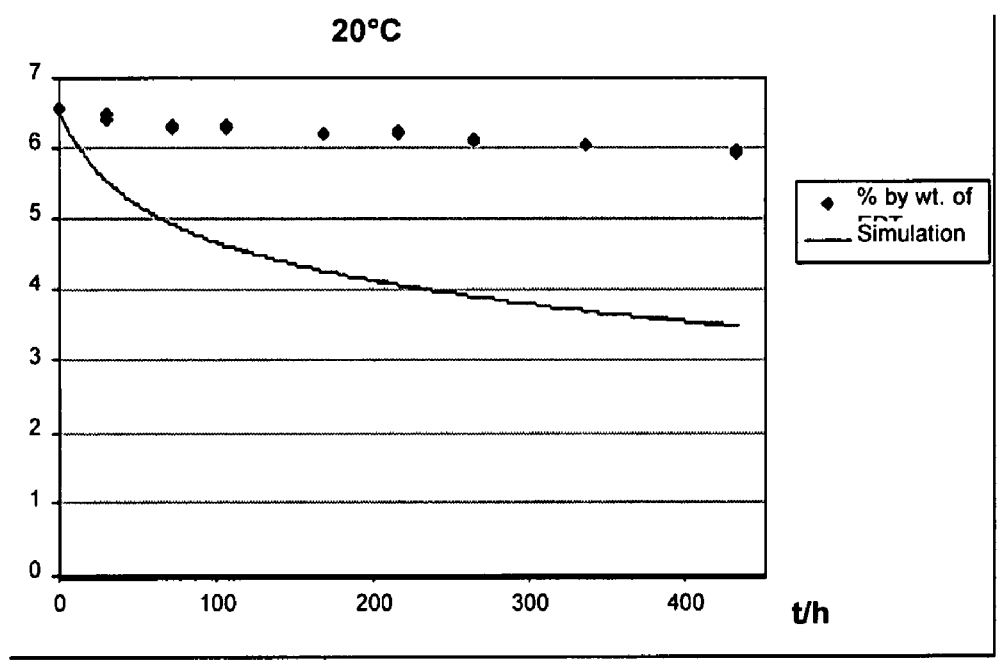
FIG. 4: is an experimentally determined monomer concentration curve (symbols ♦) for the polymerization of EDT in mixtures according to the invention at 20° C. compared with simulations (continuous line) using the constants developed from the model for the untreated oxidant.

The reaction rate for the polymerization by means of the oxidant according to the invention is significantly lower than in the corresponding reactions using untreated oxidant. FIG. 4 shows the concentration curve for EDT in the mixture according to the invention compared with the simulation using the reaction constants for the untreated oxidant.

FIG. 4: Experimentally determined monomer concentration curve (symbols ♦) for the polymerization of EDT in mixtures according to the invention at 20° C. compared with simulations (continuous line) using the constants developed from the model for the untreated oxidant.

Figure 5:
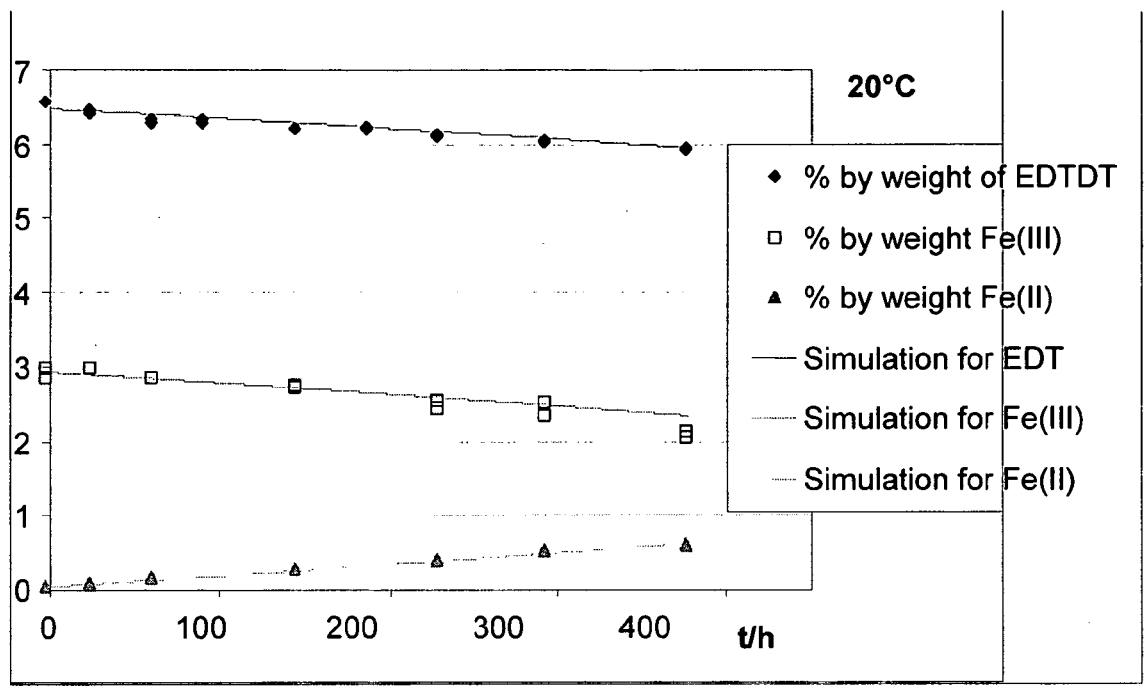
FIG. 5: illustrates experimental concentration curves for EDT, Fe(III) and Fe(II) (symbols) at 20° C. and associated simulations (lines).

To fit the present model to the experimental data, the kinetic parameters for the oxidation steps $k_0$, $k_{01}$, $k_1$, $k_{11}$ were scaled by the same factor. In this way, account was taken of the lower reaction rate of the oxidation steps. All other parameters were left unchanged. FIG. 5 shows that the experimental concentration curves can in this way be described very well by the model.

FIG. 5: Experimental concentration curves for EDT, Fe(III) and Fe(II) (symbols) at 20° C. and associated simulations (lines).

Figure 6:
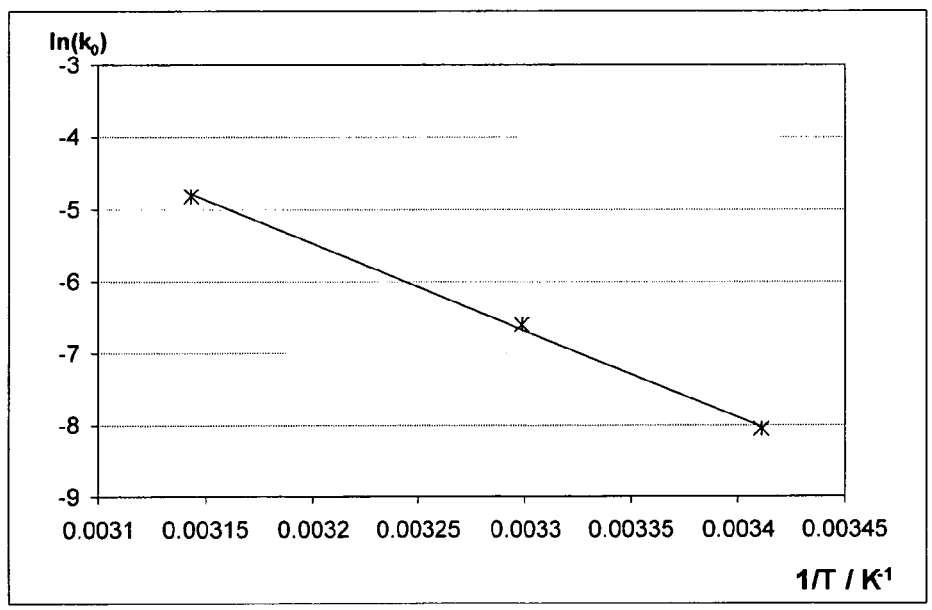
FIG. 6: is an Arrhenius plot for monomer oxidation (symbols: experimental values, line: simulation).

To determine the activation energy, the concentration curve was determined at various temperatures (20° C., 30° C., 45° C.) and the rate-determining reaction constant $k_0$ was fitted in each case. The Arrhenius plot is shown in FIG. 6. This indicates an activation energy of 100 kJ/mol. The frequency factor is $2.4 \cdot 10^{14}$ $l^1 mol^{-1} h^{-1}$.

FIG. 6: Arrhenius plot for monomer oxidation (symbols: experimental values, line: simulation).

Owing to the higher activation energy, the polymerization is significantly lower in the mixture according to the invention than in mixtures containing untreated oxidant.

The invention claimed is:

1. A process for the oxidative polymerization of precursors for the preparation of conductive polymers, the process comprising:
    providing a metal salt of an organic acid or an inorganic acid having organic radicals;
    preparing an oxidant by contacting the metal salt with an ion exchanger;
    mixing the oxidant with at least one conductive polymer precursor for preparing at least one conductive polymer; and
    separating the ion exchanger from the oxidant before mixing the oxidant with the at least one conductive polymer precursor.

2. The process according to claim 1, wherein the ion exchanger used is an anion exchanger.

3. The process according to claim 2, wherein the ion exchanger used is a weakly basic anion exchanger.

4. The process according to claim 1, wherein the metal salt is a transition metal salt.

5. The process according to claim 4, wherein the transition metal salt is an iron(III) salt.

6. The process according to claim 5, wherein the transition metal salt is Fe(III) p-toluenesulphonate, Fe(III) o-toluenesulphonate or a mixture of Fe(III) p-toluenesulphonate and Fe(III) o-toluenesulphonate.

7. The process according to claim 1, wherein the radical of the organic acid is a radical of a sulphonic acid.

8. The process according to claim 1, wherein the process is carried out in the presence of one or more solvent(s).

9. The Process according to claim 8, wherein the solvent or solvents used is/are one or more alcohol(s), water or a mixture of one or more alcohol(s) and water.

10. The process according to claim 9, wherein said alcohol(s) is/are butanol, ethanol or methanol.

11. The process according to claim 8, wherein the oxidant is separated from the solvent after treatment with the ion exchanger and optionally is redissolved in the same solvent or another solvent.

12. The process according to claim 1, wherein said oxidant is present in solution and the solution has a water content of from 0 to 10% by weight based on the total weight of the solution.

13. The process according to claim 1, wherein the separation of the oxidant from the ion exchanger is accomplished by passing a solution of the metal salt through a column containing the ion exchanger, or bringing the metal salt, a solvent and the ion exchanger together in a vessel followed by separating of the ion exchanger from the oxidant.

* * * * *